(12) United States Patent
Sugai et al.

(10) Patent No.: US 12,247,308 B2
(45) Date of Patent: Mar. 11, 2025

(54) ELECTROCHEMICAL CELL, CELL OPERATION SYSTEM AND CELL OPERATION METHOD

(71) Applicant: HONDA MOTOR CO., LTD., Tokyo (JP)

(72) Inventors: Satoshi Sugai, Wako (JP); Shoji Takasugi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 17/745,936

(22) Filed: May 17, 2022

(65) Prior Publication Data

US 2022/0372966 A1     Nov. 24, 2022

(30) Foreign Application Priority Data

May 24, 2021  (JP) .................................. 2021-086769

(51) Int. Cl.
| | |
|---|---|
| C25B 9/23 | (2021.01) |
| C25B 1/02 | (2006.01) |
| C25B 1/04 | (2021.01) |
| C25B 15/08 | (2006.01) |
| F04B 43/04 | (2006.01) |

(52) U.S. Cl.
CPC .................. *C25B 9/23* (2021.01); *C25B 1/02* (2013.01); *C25B 1/04* (2013.01); *C25B 15/08* (2013.01); *F04B 43/043* (2013.01)

(58) Field of Classification Search
None
See application file for complete search history.

(56) References Cited

U.S. PATENT DOCUMENTS

2018/0187319 A1    7/2018  Yakumaru et al.

FOREIGN PATENT DOCUMENTS

| JP | H10-326622 A | 12/1998 |
|---|---|---|
| JP | 2008010433 A * | 1/2008 |
| JP | 2018-109221 A | 7/2018 |

OTHER PUBLICATIONS

Office Action dated Oct. 11, 2022 issued over the corresponding Japanese Patent Application No. 2021-086769 with the English translation thereof.

* cited by examiner

*Primary Examiner* — Louis J Rufo
(74) *Attorney, Agent, or Firm* — Carrier, Shende & Associates P.C.; Joseph P. Carrier; Jeffrey T. Gedeon

(57) ABSTRACT

An anode current collector of an electrochemical cell includes an inner portion in which a first hole is formed, and an outer portion located outside the inner portion and in which a second hole is formed. The first hole has a cross-sectional area that increases toward a supply flow path, and the second hole has a cross-sectional area that increases toward an electrolyte membrane.

9 Claims, 8 Drawing Sheets

ELECTROCHEMICAL CELL, CELL OPERATION SYSTEM AND CELL OPERATION METHOD

CROSS-REFERENCE TO RELATED APPLICATIONS

This application is based upon and claims the benefit of priority from Japanese Patent Application No. 2021-086769 filed on May 24, 2021, the contents of which are incorporated herein by reference.

BACKGROUND OF THE INVENTION

Field of the Invention

The present invention relates to an electrochemical cell including a structure in which a catalyst layer and a current collector are disposed on both surfaces of an electrolyte membrane having hydrogen ion conductivity.

Description of the Related Art

The electrochemical cell is used for a fuel cell, a water electrolysis device, an electrochemical hydrogen compressor, or the like. The electrochemical hydrogen compressor has an advantage that high-pressure hydrogen necessary for a fuel cell electric vehicle or the like can be generated even if the number of electrochemical cells is one. Further, the electrochemical hydrogen compressor has an advantage that it is smaller in size and less in operating noise than the mechanical hydrogen compressor.

In the electrochemical hydrogen compressor, a differential pressure of hydrogen acts on an electrolyte membrane. As such, there are cases that the electrochemical hydrogen compressor may be provided with a support member that is adjacent to the electrolyte membrane and supports the electrolyte membrane. For example, JP 2018-109221 A discloses an electrochemical hydrogen compressor in which an anode diffusion layer (support member) is formed by laminating a plurality of metal sheets having vent holes.

SUMMARY OF THE INVENTION

In the electrolyte membrane having hydrogen ion conductivity, the electric resistance increases with decreasing amount of water. Therefore, there are cases that water vapor may be contained in hydrogen to be supplied to the electrochemical cell.

However, depending on the operating conditions of the electrochemical cell, the amount of water supplied to the electrolyte membrane through such hydrogen may be greater than the amount of water consumed by the electrolyte membrane. In this case, water returning from the cathode side to the anode side of the electrolyte membrane due to the differential pressure tends to stay as water condensed on the surface of the anode or the like.

When water is retained on the surface of the anode or the like, the reaction area between the treatment target such as hydrogen and the catalyst layer decreases, and thus there is a problem in that the hydrogen transport performance and the energy efficiency decrease.

An object of the present invention is to solve the above-described problems.

According to an aspect of the present invention, there is provided an electrochemical cell including: an electrolyte membrane; an anode current collector laminated on one surface of the electrolyte membrane; a cathode current collector laminated on another surface of the electrolyte membrane; and a supply flow path that is disposed on a surface of the anode current collector opposite to a surface thereof facing the electrolyte membrane and through which a fluid to be supplied to the anode current collector flows, wherein the anode current collector includes an inner portion in which a first hole is formed, and an outer portion which is located outside the inner portion and in which a second hole is formed, the first hole having a cross-sectional area that increases toward the supply flow path, the second hole having a cross-sectional area that increases toward the electrolyte membrane.

According to another aspect of the present invention, there is provided a cell operation system including: the above-described electrochemical cell; a fluid supply device configured to supply the fluid to the electrochemical cell; a power supply device configured to apply a voltage between the anode current collector and the cathode current collector; a sensor configured to detect an electrical state between the anode current collector and the cathode current collector; and a control device configured to control the power supply device so as to stop application of the voltage and control the fluid supply device so as to increase a flow rate of the fluid flowing through the supply flow path if a value indicating the electrical state exceeds a predetermined threshold value.

According to still another aspect of the present invention, there is provided a cell operation method of operating the above-described electrochemical cell, the method including: applying a voltage between the anode current collector and the cathode current collector; and if a value indicating an electrical state between the anode current collector and the cathode current collector exceeds a predetermined threshold value, stopping application of the voltage and increasing a flow rate of the fluid flowing through the supply flow path.

In the electrochemical cell, the cell operation system, and the cell operation method, the retained water retained on the anode side of the electrochemical cell is sucked out into the supply flow path by the negative pressure generated in the first hole. As a result, in the electrochemical cell, the cell operation system, and the cell operation method described above, it is possible to suppress a decrease in hydrogen transport performance and energy efficiency caused by retained water. In addition, in the electrochemical cell, the cell operation system, and the cell operation method described above, the retained water flows from the outer portion to the inner portion of the electrochemical cell by the negative pressure generated in the second holes, and accordingly water is uniformly distributed in the planes lying between the layers or the like. As a result, in the electrochemical cell, the cell operation system, and the cell operation method as described above, it is possible to suppress a decrease in hydrogen transport performance and energy efficiency due to drying of the electrolyte membrane.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
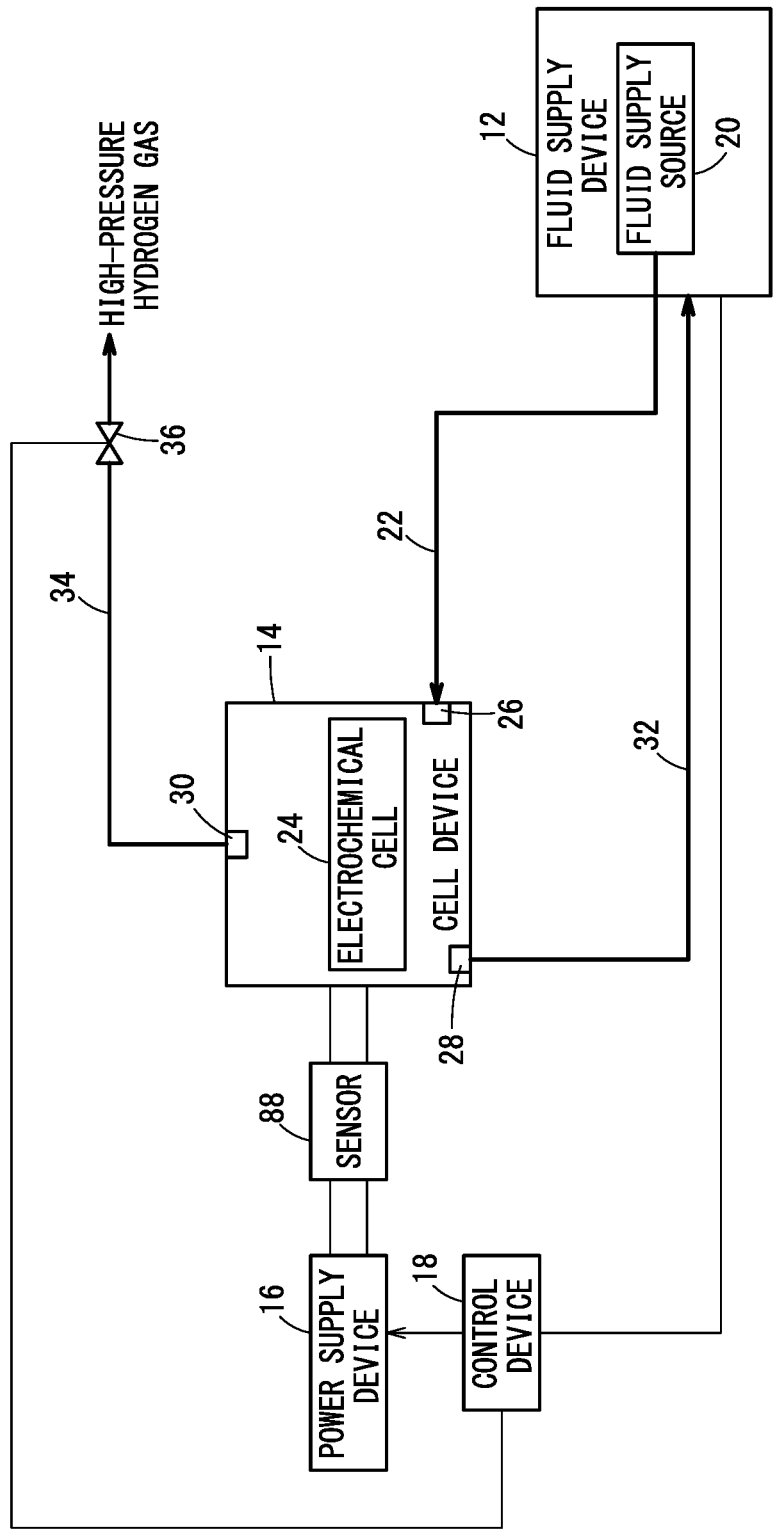
FIG. 1 is a schematic diagram showing a cell operation system of an embodiment.

FIG. 1 is a schematic diagram showing a cell operation system 10 of an embodiment. The cell operation system 10 includes a fluid supply device 12, a cell device 14, a power supply device 16, and a control device 18.

The fluid supply device 12 is a device that supplies fluid to the cell device 14. In this embodiment, the fluid is hydrogen (hydrogen gas). The hydrogen gas contains water vapor. The fluid supply device 12 includes a fluid supply source 20 and an introduction path 22. The introduction path 22 introduces the fluid output from the fluid supply source 20 into the cell device 14.

In the present embodiment, the cell device 14 is an electrochemical hydrogen compressor that compresses hydrogen by an oxidation-reduction reaction of hydrogen using electric power. The cell device 14 includes an electrochemical cell 24, an introduction port 26, a first discharge port 28, and a second discharge port 30. The electrochemical cell 24 is configured to allow an electrochemical reaction to take place. The configuration of the electrochemical cell 24 will be described later. The introduction path 22 of the fluid supply device 12 is connected to the introduction port 26. The fluid flowing through the introduction path 22 flows into the cell device 14 from the introduction port 26.

Of the fluid flowing into the cell device from the introduction port 26, part of the fluid that has not been consumed by the electrochemical cell 24 is discharged to the first discharge port 28. The fluid supply device 12 may be connected to the first discharge port 28 via a return path 32. Accordingly, the fluid supply device 12 can supply fluid that has flowed into the fluid supply device from the first discharge port 28 via the return path 32, to the cell device 14 again.

A discharge flow path 34 is connected to the second discharge port 30. A generated fluid generated by an electrochemical reaction in the electrochemical cell 24 flows through the discharge flow path 34. In the present embodiment, the generated fluid is high-pressure hydrogen gas that is higher in pressure than the hydrogen gas supplied to the cell device 14.

The discharge flow path 34 is provided with a pressure adjusting valve 36 that adjusts the pressure of the generated fluid in the discharge flow path 34. The opening degree of the pressure adjusting valve 36 is adjusted by control of the control device 18. The pressure adjusting valve 36 may be a back pressure valve that adjusts the pressure of the generated fluid such that the pressure on the primary side (valve input side) is constant.

The power supply device 16 applies a voltage to the electrochemical cell 24 of the cell device 14. When the cell device 14 includes a plurality of the electrochemical cells 24, the power supply device 16 applies a voltage to each of the electrochemical cells 24.

The control device 18 appropriately controls the fluid supply device 12, the power supply device 16, and the pressure adjusting valve 36 such that an electrochemical reaction is caused in one or a plurality of the electrochemical cells 24 provided in the cell device 14.

Figure 2:
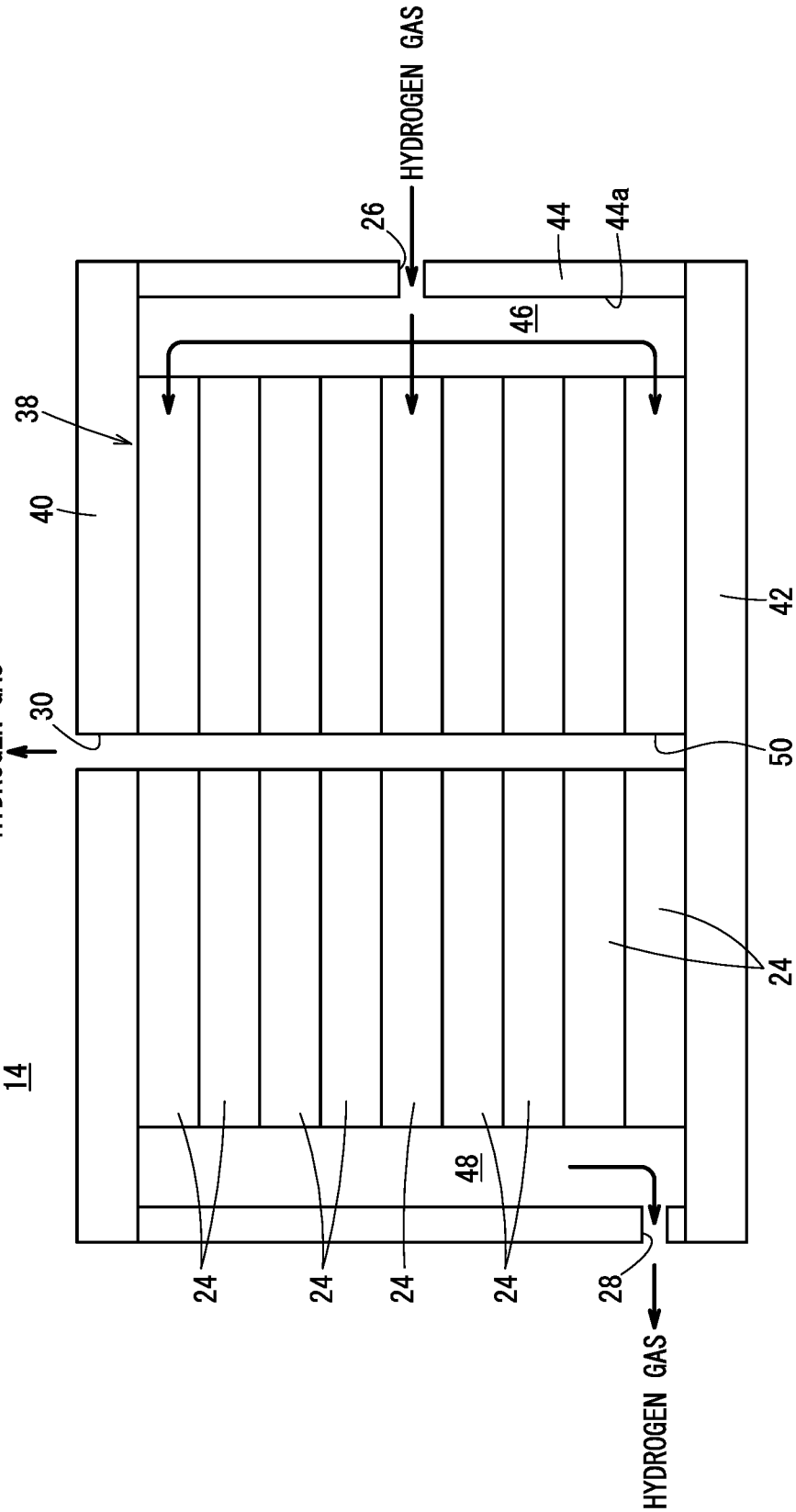
FIG. 2 is a cross-sectional view showing the configuration of a cell device.

FIG. 2 is a cross-sectional view showing the configuration of the cell device 14. FIG. 2 shows an example in which the cell device 14 includes a plurality of the electrochemical cells 24. The cell device 14 includes a cell stack body 38. The cell stack body 38 comprises a plurality of the electrochemical cells 24. The plurality of electrochemical cells 24 are stacked together.

A first end plate 40 is disposed at one end of the cell stack body 38 in the stacking direction, and a second end plate 42 is disposed at the other end of the cell stack body 38 in the stacking direction. The cell stack body 38 is sandwiched and held between the first end plate 40 and the second end plate 42, and a predetermined tightening load is applied to the cell stack body 38.

The first end plate 40 and the second end plate 42 are formed in a planar shape having a size larger than that of the cell stack body 38. A side wall 44 is provided so as to link an outer peripheral portion of the first end plate 40 and an outer peripheral portion of the second end plate 42, like a bridge. The side wall 44 surrounds the outer periphery of the cell stack body 38. The first end plate 40, the second end plate 42, and the side wall 44 form a hermetically-closed internal space 44a in which the cell stack body 38 is disposed. The introduction port 26 is provided in the side wall 44. The first discharge port 28 is provided in a portion of the side wall 44 opposite to the portion of the side wall 44 in which the introduction port 26 is provided.

A distribution flow passage 46 communicating with the introduction port 26 is provided in the internal space 44a. As indicated by arrows, the distribution flow passage 46 guides the hydrogen gas introduced from the introduction port 26, to the anode side of each electrochemical cell 24.

A collecting flow passage 48 communicating with the first discharge port 28 is provided in the internal space 44a. As indicated by arrows, the collecting flow passage 48 guides excess hydrogen gas that has not been consumed in each electrochemical cell 24, to the first discharge port 28.

A communication hole 50 is formed in the central portion of the cell stack body 38 so as to penetrate through the cell stack body in the stacking direction of the plurality of electrochemical cells 24. The communication hole 50 penetrates through the plurality of electrochemical cells 24. The communication hole 50 communicates with the cathode side of each electrochemical cell 24. The communication hole 50 is connected to the second discharge port 30 and allows the cathode side of each electrochemical cell 24 to communicate with the second discharge port 30.

Figure 3:
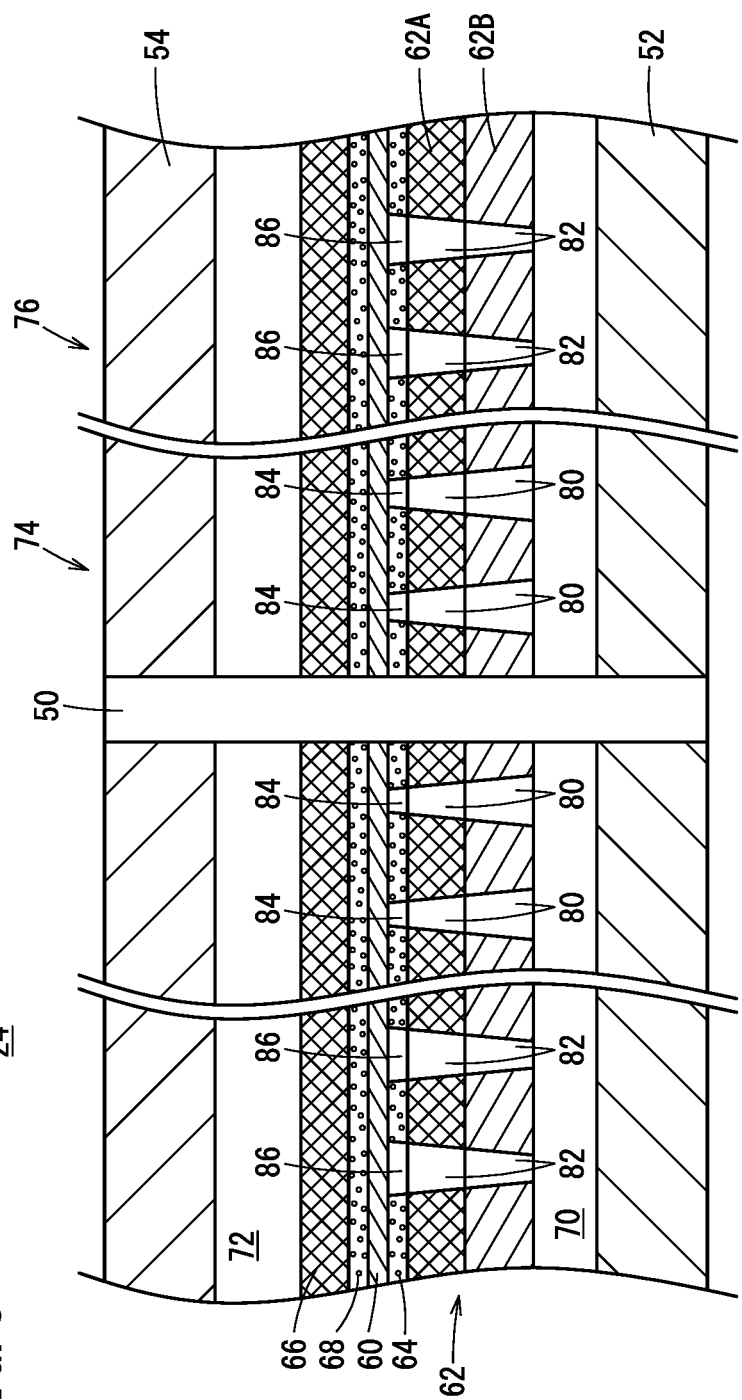
FIG. 3 is a cross-sectional view showing the configuration of an electrochemical cell.

FIG. 3 is a cross-sectional view showing the configuration of the electrochemical cell 24. The electrochemical cell 24 is sandwiched and held between a first separator 52 disposed on one end side (anode side) of the electrochemical cell 24 in the thickness direction (stacking direction) and a second separator 54 disposed on the other end side (cathode side). The first separator 52 and the second separator 54 are each formed of, for example, a steel plate, a stainless steel plate, an aluminum plate, or a plated steel plate.

The electrochemical cell 24 includes an electrolyte membrane 60, an anode current collector 62, an anode catalyst layer 64, a cathode current collector 66, and a cathode catalyst layer 68.

The electrolyte membrane 60, for example, is a solid polymer electrolyte membrane (cation ion exchange membrane). A fluorine based electrolyte may be used as the electrolyte membrane 60. Alternatively, an HC (hydrocarbon) based electrolyte may be used as the electrolyte membrane 60. As a specific example, the electrolyte membrane 60 may be a thin film of perfluorosulfonic acid containing water. The electrolyte membrane 60 may have a protective sheet (not shown) including a fibrous skeleton, on the anode side.

The anode current collector 62 is laminated on one surface of the electrolyte membrane 60. Specifically, the anode current collector 62 is laminated on a surface of the anode catalyst layer 64 that is opposite to a surface thereof facing the electrolyte membrane 60. The anode current collector 62 may be formed by stacking a plurality of conductive mesh sheets of metal, carbon, or the like. The anode current collector 62 may be formed of a conductive plate-shaped member made of metal, carbon, or the like.

In this embodiment, the anode current collector 62 has a double-layered structure of a current collecting layer 62A and a support layer 62B. The current collecting layer 62A is disposed on the electrolyte membrane 60 side. The current collecting layer 62A is formed by stacking a plurality of conductive mesh sheets. The support layer 62B is disposed on a surface of the current collecting layer 62A opposite to a surface of the current collecting layer 62A facing the electrolyte membrane 60. The support layer 62B is formed of a plate-shaped member having electric conductivity.

The anode catalyst layer 64 is disposed between the electrolyte membrane 60 and the anode current collector 62. The anode catalyst layer 64 is joined to one surface of the electrolyte membrane 60. The anode catalyst layer 64 is formed of, for example, a carbon porous body supporting catalyst particles such as platinum.

The cathode current collector 66 is laminated on the other surface side of the electrolyte membrane 60. Specifically, the cathode current collector 66 is laminated on a surface of the cathode catalyst layer 68 opposite to a surface thereof facing the electrolyte membrane 60. The cathode current collector 66 may be formed by stacking a plurality of conductive mesh sheets of metal, carbon, or the like. The cathode current collector 66 may be formed of a conductive plate-shaped member made of metal, carbon, or the like. FIG. 3 shows the cathode current collector 66 formed by stacking a plurality of conductive mesh sheets.

The cathode catalyst layer 68 is disposed between the electrolyte membrane 60 and the cathode current collector 66. The cathode catalyst layer 68 is joined to the other surface of the electrolyte membrane 60. The cathode catalyst layer 68 is formed of, for example, a carbon porous body supporting catalyst particles such as platinum.

In the electrochemical cell 24, a supply flow path 70 is provided between the support layer 62B of the anode current collector 62 and the first separator 52. The supply flow path 70 communicates with the distribution flow passage 46 (FIG. 2) and the collecting flow passage 48 (FIG. 2). The supply flow path 70 may be a groove formed in a surface of the support layer 62B that faces the first separator 52 or a surface of the first separator 52 that faces the support layer 62B. The support layer 62B has a contact portion that is in contact with the first separator 52. The electrochemical cell 24 is supported by the first separator 52 via this contact portion.

In the electrochemical cell 24, a discharge flow path portion 72 is provided between the cathode current collector 66 and the second separator 54. The discharge flow path portion 72 communicates with the communication hole 50. The discharge flow path portion 72 may be a groove formed in a surface of the cathode current collector 66 that faces the second separator 54 or a surface of the second separator 54 that faces the cathode current collector 66. The cathode current collector 66 has a contact portion that is in contact with the second separator 54.

Figure 4:
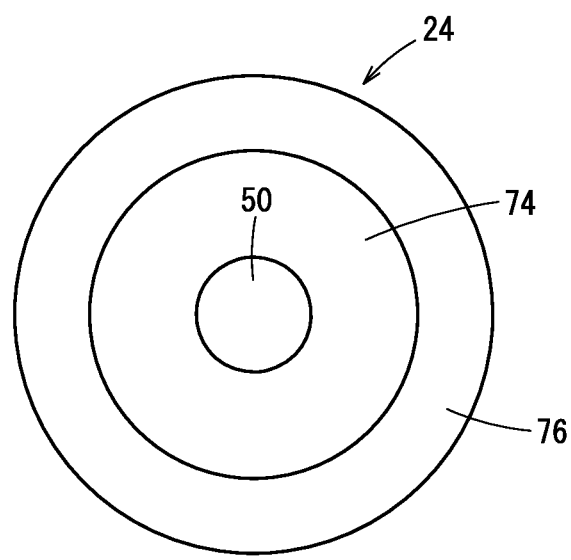
FIG. 4 is a view of the electrochemical cell in the stacking direction.

FIG. 4 is a view of the electrochemical cell 24 as viewed in the stacking direction. The electrochemical cell 24 has an inner portion 74 and an outer portion 76. The outer portion 76 is located outward of the inner portion 74.

The communication hole 50 is formed in the inner portion 74. As shown in FIG. 3, first holes 80 are formed in the anode current collector 62 of the inner portion 74. The cross-sectional area of the first hole 80 increases toward the supply flow path 70. On the other hand, as shown in FIG. 3, second holes 82 are formed in the anode current collector 62 of the outer portion 76. The cross-sectional area of the second hole 82 increases toward the electrolyte membrane 60. The first holes 80 and the second holes 82 may be formed so as to penetrate through a single member. Alternatively, the first holes 80 and the second holes 82 may be formed by stacking a plurality of sheets having holes of different sizes.

As shown in FIG. 3, first communication holes 84 communicating with the respective first holes 80 are formed in the anode catalyst layer 64 of the inner portion 74. The first communication holes 84 may be formed in the anode catalyst layer 64 so as to be smoothly continuous with the first holes 80 (i.e., the holes having the same size at the connection). The first communication holes 84 may be formed in the anode catalyst layer 64 so as to be non-smoothly continuous with the first holes 80 (i.e., the holes having different sizes at the connection). In a case where the first communication holes 84 are formed in the anode catalyst layer 64 so as to be smoothly continuous with the first holes 80, the cross-sectional area of each first communication hole 84 increases toward the supply flow path 70. In this case, it is preferable that the inner wall of the first hole 80 and the inner wall of the first communication hole 84 are smoothly continuous with each other. FIG. 3 shows a case where the inner wall of the first hole 80 and the inner wall of the first communication hole 84 are smoothly continuous with each other.

On the other hand, as shown in FIG. 3, second communication holes 86 communicating with the second holes 82 are formed in the anode catalyst layer 64 of the outer portion 76. The second communication holes 86 may be formed in the anode catalyst layer 64 so as to be smoothly continuous with the second holes 82. The second communication holes 86 may be formed in the anode catalyst layer 64 so as to be non-smoothly continuous with the second holes 82. In a case where the second communication holes 86 are formed in the anode catalyst layer 64 so as to be smoothly continuous with the second holes 82, the cross-sectional area of each second communication hole 86 increases toward the electrolyte membrane 60. In this case, it is preferable that the inner wall of the second hole 82 and the inner wall of the second communication hole 86 are continuous with each other. FIG. 3 shows a case where the inner wall of the second hole 82 and the inner wall of the second communication hole 86 are continuous with each other.

Next, a cell operation method for operating the electrochemical cell 24 will be described. The cell operation method is executed by the control device 18. The control device 18 operates the electrochemical cell 24 to generate high-pressure hydrogen gas. That is, the control device 18 controls the power supply device 16 to thereby apply a voltage between the anode current collector 62 and the cathode current collector 66 of the cell device 14. The control device 18 also controls the fluid supply device 12 to thereby supply hydrogen gas to the cell device 14. Further, the control device 18 adjusts the opening degree of the pressure adjusting valve 36 with respect to the discharge flow path 34.

The hydrogen gas supplied from the fluid supply device 12 to the cell device 14 flows into the distribution flow passage 46 (FIG. 2) inside the cell device 14 from the introduction port 26 (FIG. 2). The hydrogen gas that has flowed into the distribution flow passage 46 flows through the supply flow path 70 (FIG. 3) of the electrochemical cell 24.

Figure 5:
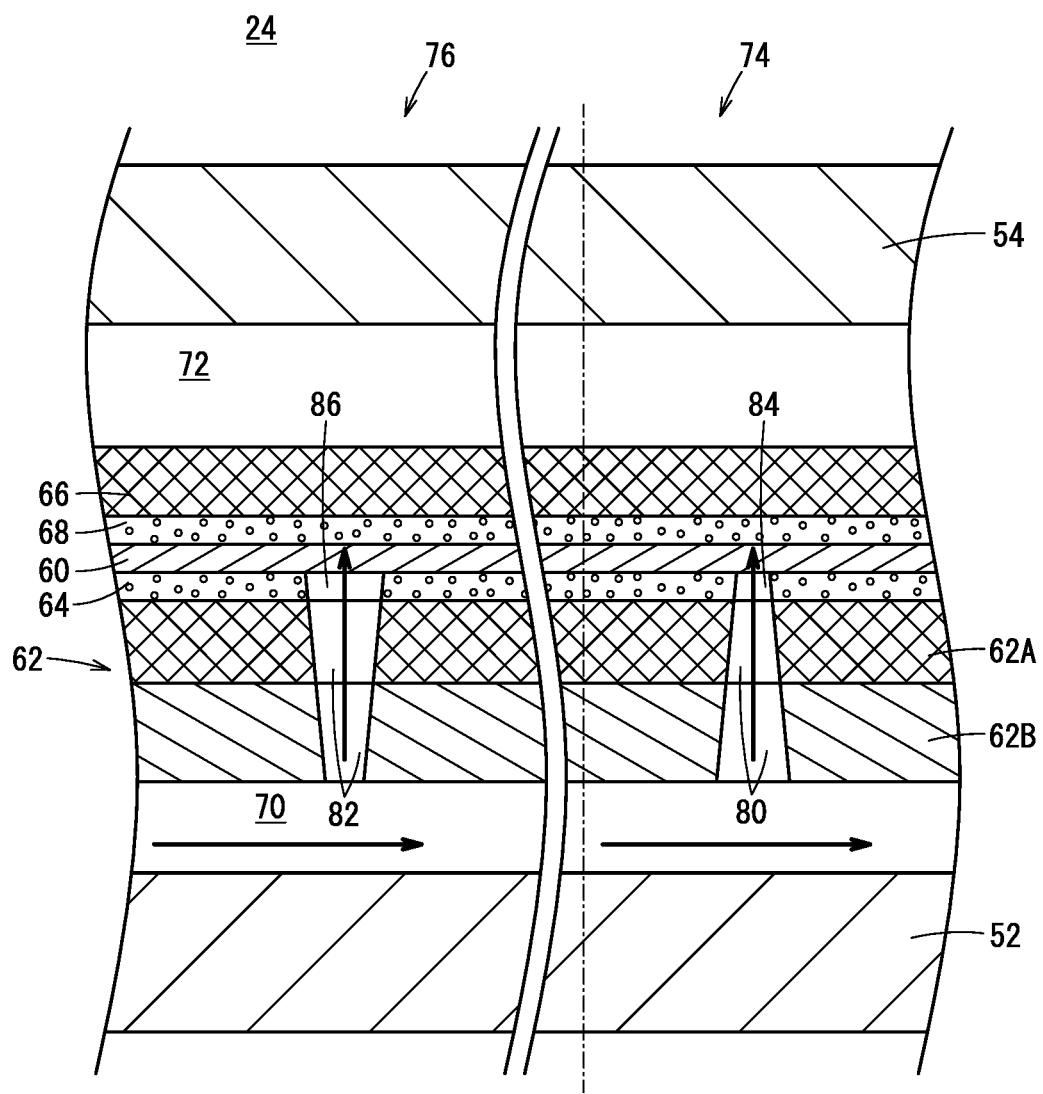
FIG. 5 is a view showing a state of a fluid in the electrochemical cell.

FIG. 5 is a view showing the state of the fluid in the electrochemical cell 24. As indicated by arrows, part of the hydrogen gas flowing through the supply flow path 70 reaches the anode catalyst layer 64 through the second holes 82 and the second communication holes 86. As indicated by arrows, another part of the hydrogen gas flowing through the supply flow path 70 reaches the anode catalyst layer 64 through the first holes 80 and the first communication holes 84. The hydrogen gas that has reached the anode catalyst layer 64 is converted into protons ($H^+$ ions) by the catalytic action of the anode catalyst layer 64.

The protons are transported to the cathode catalyst layer 68 through the electrolyte membrane 60 based on a voltage applied between the anode current collector 62 and the cathode current collector 66. The protons transported to the cathode catalyst layer 68 are converted into high-pressure hydrogen gas by an electrochemical reaction under the catalytic action of the cathode catalyst layer 68. The converted high-pressure hydrogen gas is discharged to the discharge flow path portion 72 through the cathode current collector 66. The high-pressure hydrogen gas discharged to the discharge flow path portion 72 flows out from the second discharge port 30 to the discharge flow path 34 (FIG. 1) through the communication hole 50 (FIG. 2).

Part of the water vapor contained in the hydrogen gas is used to humidify the electrolyte membrane 60. Excess water in the electrolyte membrane 60 returns to the anode side due to the pressure gradient. The water that has returned to the anode side tends to stay between the electrolyte membrane 60 and the anode catalyst layer 64, between the anode catalyst layer 64 and the anode current collector 62, or the like. When retained water staying between the layers or the like is generated, hydrogen transport performance and energy efficiency are reduced.

Figure 6:
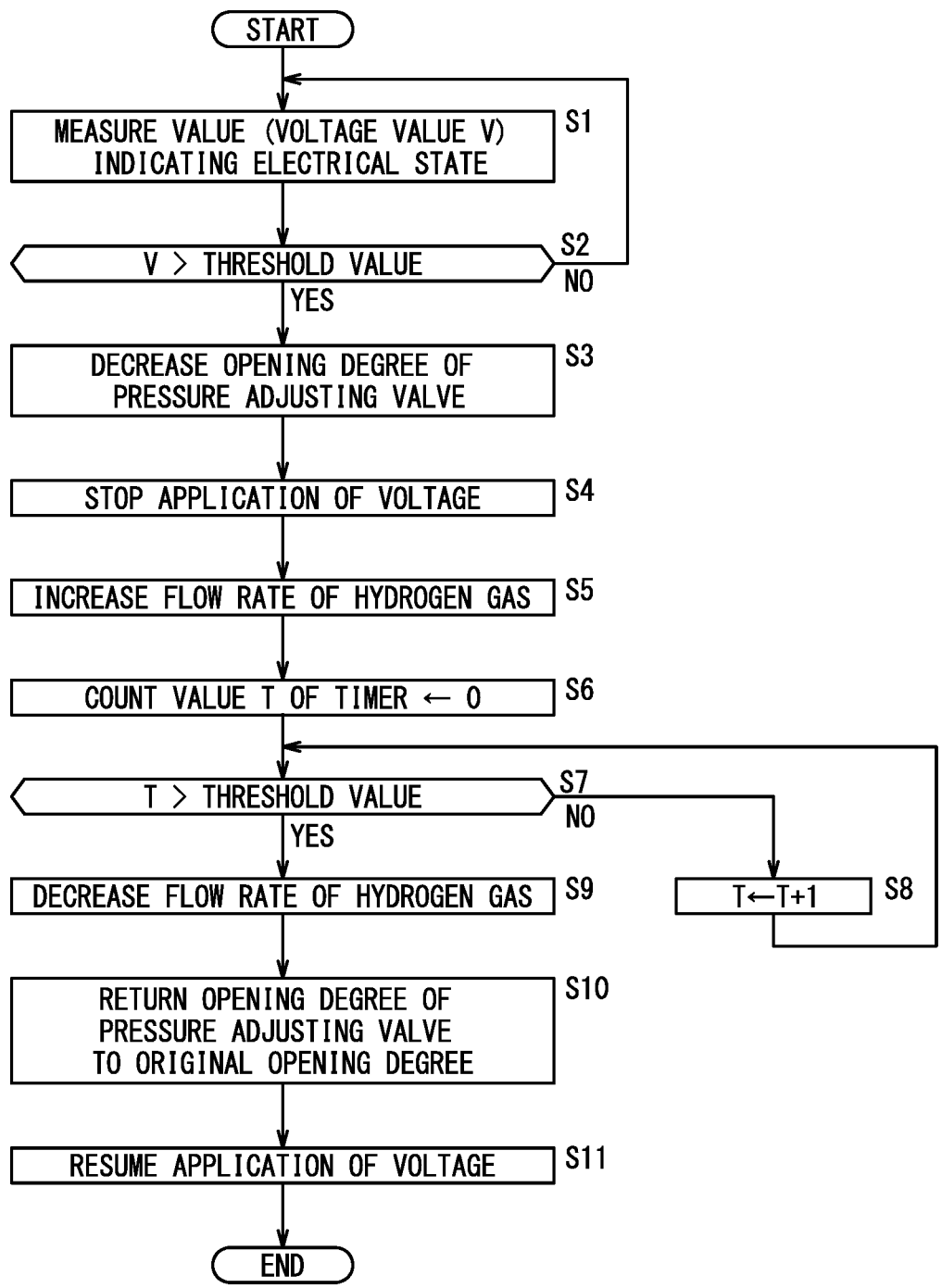
FIG. 6 is a flowchart showing the procedure of a control process.

Therefore, the control device 18 of the present embodiment is provided with a control process for removing the retained water. This control process is executed during an operation in which the electrochemical cell 24 is operated so as to generate high-pressure hydrogen gas. FIG. 6 is a flowchart showing the procedure of the control process.

In step S1, the control device 18 measures an electrical state between the anode current collector 62 and the cathode current collector 66 in time series using a sensor 88 (FIG. 1). The sensor 88 detects the electrical state between the anode current collector 62 and the cathode current collector 66. When a plurality of electrochemical cells 24 are provided in the cell device 14, one sensor 88 is provided for each of the plurality of electrochemical cells 24. In this case, the control device 18 measures the electrical state between the anode current collector 62 and the cathode current collector 66 of each electrochemical cell 24 using each sensor 88.

The sensor 88 is a sensor that detects an electrical state between the anode current collector 62 and the cathode current collector 66. More specifically, a voltage sensor or a current sensor may be used. The electrical state measured by the control device 18 may be a voltage value V applied between the anode current collector 62 and the cathode current collector 66. Alternatively, the electrical state measured by the control device 18 may be a current value I flowing between the anode current collector 62 and the cathode current collector 66. In the present embodiment, the control device 18 measures a voltage value V applied between the anode current collector 62 and the cathode current collector 66. It is noted that, even if the sensor 88 is a current sensor, the control device 18 can measure the voltage value V applied between the anode current collector 62 and the cathode current collector 66, based on a signal output from the current sensor.

In step S2, the control device 18 compares the measured voltage value V with a predetermined threshold value. If the voltage value V is equal to or less than the threshold value, the control device 18 returns to step S1. On the other hand, if the voltage value V exceeds the predetermined threshold value, the control device 18 proceeds to step S3.

In a case where a plurality of electrochemical cells 24 are provided in the cell device 14, if the number of electrochemical cells 24 for which the voltage value V exceeds the threshold value exceeds a prescribed number, the control device 18 proceeds to step S3.

In step S3, the control device 18 controls the pressure adjusting valve 36 such that the opening degree of the pressure adjusting valve 36 decreases (the opening degree of the pressure adjusting valve 36 is narrowed), and proceeds to step S4. As the opening degree of the pressure adjusting valve 36 decreases, the pressure of the high-pressure hydrogen gas generated in the cathode catalyst layer 68 (the force pressing the electrochemical cell 24 toward the anode) increases.

In step S4, the control device 18 controls the power supply device 16 so as to stop application of the voltage applied between the anode current collector 62 and the cathode current collector 66, and proceeds to step S5.

In step S5, the control device 18 controls the fluid supply device 12 so as to increase the flow rate of the hydrogen gas flowing through the supply flow path 70. For example, the control device 18 can increase the flow rate of the hydrogen gas flowing through the supply flow path 70 by increasing the opening degree of an introduction valve (not shown) of the fluid supply device 12 provided on the introduction path 22. After increasing the flow rate of the hydrogen gas flowing through the supply flow path 70, the control device 18 proceeds to step S6.

In step S6, the control device 18 sets the count value T of a timer for measuring the stop time of the voltage, to "0", and proceeds to step S7.

In step S7, the control device 18 compares the count value T of the timer with a predetermined count threshold value. Here, when the count value T of the timer is equal to or less than the count threshold value, the control device 18 proceeds to step S8, increments the count value T of the timer by "1", and then returns to step S7. On the other hand, when the count value T of the timer exceeds the count threshold value, the control device 18 proceeds to step S9.

In step S9, the control device 18 controls the fluid supply device 12 such that the flow rate of the hydrogen gas flowing through the supply flow path 70 decreases. For example, the control device 18 returns the opening degree of the introduction valve (not shown) of the fluid supply device 12 to the original opening degree (the opening degree immediately before increasing the opening degree of the introduction valve in step S5). As a result, the flow rate of the hydrogen gas flowing through the supply flow path 70 decreases. After decreasing the flow rate of the hydrogen gas flowing through the supply flow path 70, the control device 18 proceeds to step S10.

In step S10, the control device 18 returns the opening degree of the pressure adjusting valve 36 to the original opening degree (the opening degree immediately before the opening degree of the pressure adjusting valve 36 is reduced in step S3), and proceeds to step S11.

In step S11, the control device 18 controls the power supply device 16 so as to apply a voltage between the anode current collector 62 and the cathode current collector 66, and then ends the control process.

Incidentally, in step S11, the control device 18 may return to step S1 after controlling the power supply device 16 so as to apply a voltage between the anode current collector 62 and the cathode current collector 66. The order of the steps in the above-described control process may be changed. For example, the order of step S3 and step S4 may be reversed, or the order of step S4 and step S5 may be reversed.

Alternatively, the order of step S9 and step S10 may be reversed, and the order of step S10 and step S11 may be reversed.

Figure 7:
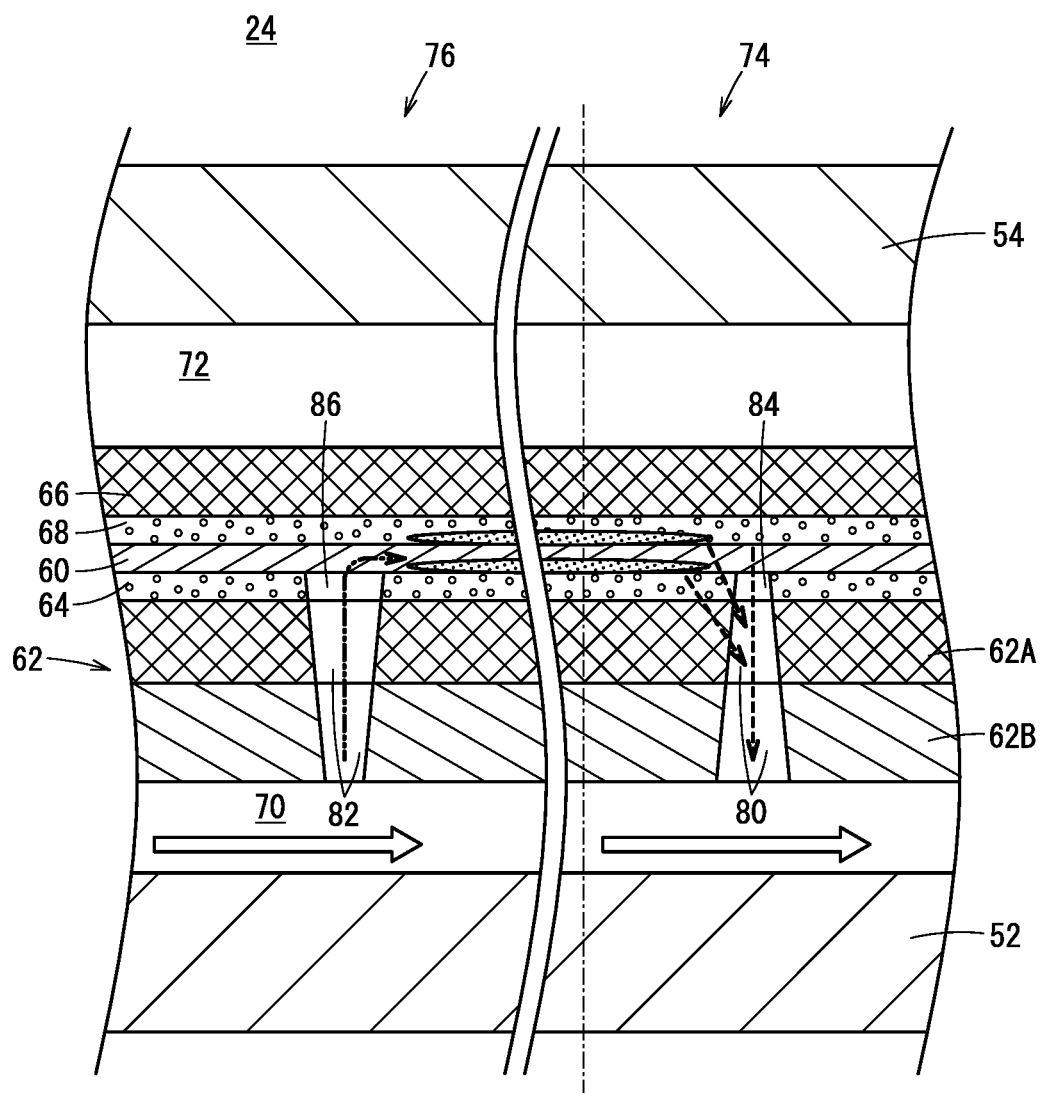
FIG. 7 is a diagram showing a state of the fluid in the electrochemical cell when retained water is removed.

FIG. 7 is a diagram showing the state of the fluid in the electrochemical cell 24 in a case of removing the retained water. As indicated by a white arrow, when the flow rate of the hydrogen gas flowing through the supply flow path 70 is increased by the above-described control process, negative pressure is generated in the first hole 80 and the second hole 82 formed in the anode current collector 62.

The cross-sectional area of the first hole 80 formed in the anode current collector 62 increases toward the supply flow path 70. Therefore, when a negative pressure is generated in the first hole 80, retained water retained between the layers or the like is sucked out into the supply flow path 70 through the first hole 80 as indicated by a dashed line arrow. As a result, a decrease in hydrogen transport performance and energy efficiency due to retained water is suppressed.

When the cross-sectional area of the first communication hole 84 increases toward the supply flow path 70 and the inner wall of the first communication hole 84 is continuous with the inner wall of the first hole 80, it becomes easy for negative pressure to be generated in the first communication hole 84 as the flow rate of the hydrogen gas flowing through the supply flow path 70 increases. For this reason, the force of sucking out the retained water retained between the layers or the like into the supply flow path 70 through the first holes 80 and the first communication holes 84 is increased. Therefore, the removal efficiency of the retained water is enhanced.

On the other hand, the cross-sectional area of the second hole 82 formed in the anode current collector 62 increases toward the electrolyte membrane 60. Therefore, even if a negative pressure is generated in the second hole 82, the retained water is restricted from being sucked out into the supply flow path 70 through the second hole 82. Accordingly, as shown by the two dot chain line arrow, the retained water retained between the layers or the like flows from the outer portion 76 of the electrochemical cell 24 into the inner portion 74 thereof, and thus water is uniformly distributed in the planes between the layers or the like. As a result, a decrease in hydrogen transport performance and energy efficiency due to drying is suppressed.

In a case where the cross-sectional area of the second communication hole 86 increases toward the electrolyte membrane 60 and the inner wall of the second communication hole 86 is continuous with the inner wall of the second hole 82, the retained water retained between the layers or the like easily flows from the outer portion 76 to the inner portion 74 of the electrochemical cell 24. As a result, uniformity of distribution of water in the planes between the layers or the like is enhanced.

Figure 8:
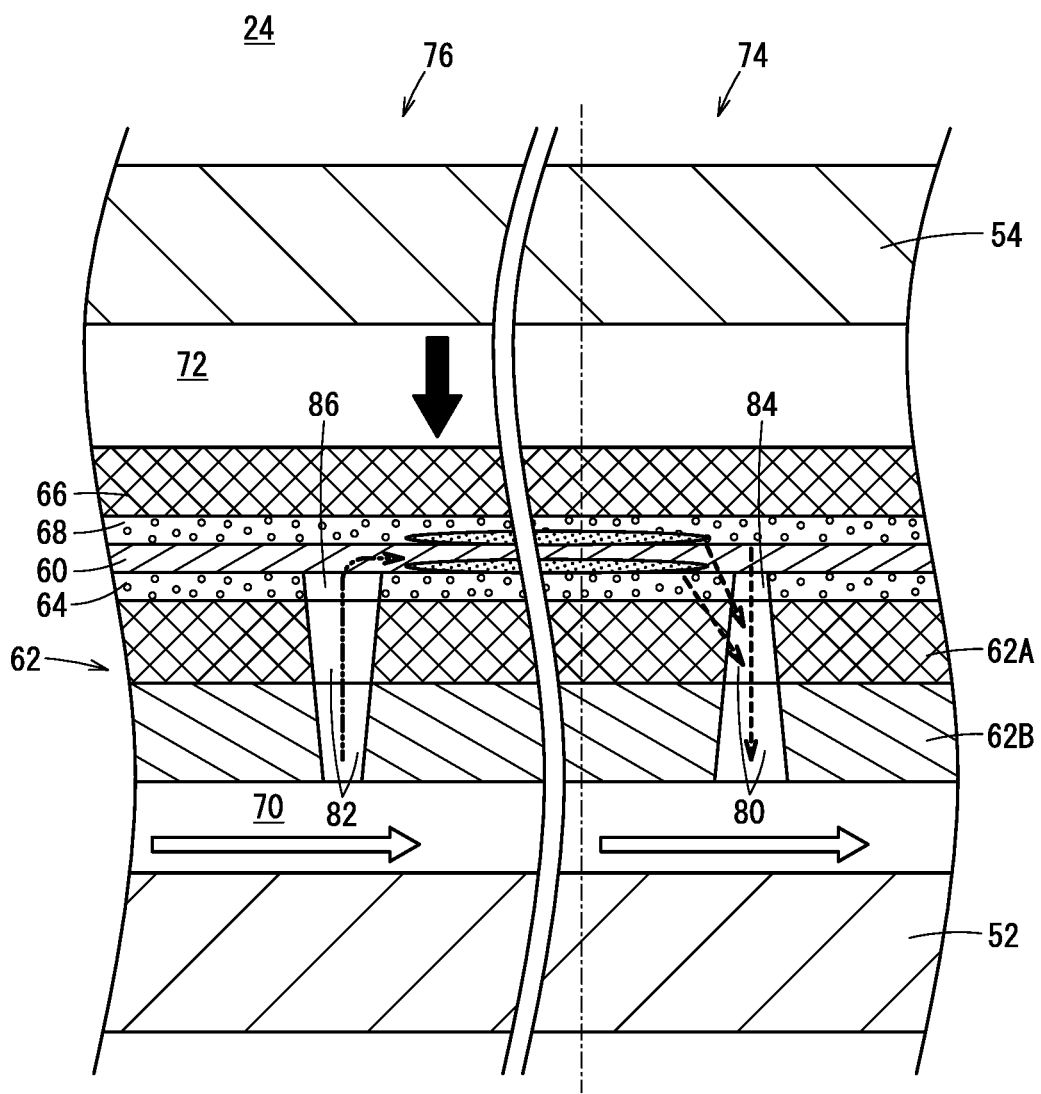
FIG. 8 is a diagram showing a state in which the pressure of the generated fluid is increased in the electrochemical cell when the retained water is removed.

FIG. 8 is a diagram showing a state in which the pressure of the generated fluid is increased in the electrochemical cell 24 when the retained water is removed. In the above-described control process, the opening degree of the pressure adjusting valve 36 is reduced in a state where the flow rate of the hydrogen gas flowing through the supply flow path 70 is increased. For this reason, the pressure of the high-pressure hydrogen gas discharged to the discharge flow path 34 by the electrochemical reaction increases, and the electrochemical cell 24 is pressed toward the anode as indicated by the black arrow. Accordingly, the retained water retained between the layers or the like is pushed out to the first holes 80 or the first communication holes 84. As a result, the amount of water sucked out into the supply flow path 70 increases, and the removal efficiency of the retained water is enhanced.

The above-described embodiment may be modified as follows.

For example, the cell device 14 may be a water electrolysis device that electrolyzes water to generate hydrogen (hydrogen gas) as a generated fluid. When the cell device 14 is a water electrolysis device, the fluid supply device 12 supplies water to the cell device 14. In this case, the support layer 62B of the anode current collector 62 in the electrochemical cell 24 included in the cell device 14 may be omitted.

Even if the cell device 14 is a water electrolysis device, retained water may be retained on the anode side of the electrochemical cell 24, depending on the operating conditions of the electrochemical cell 24. Therefore, even if the cell device 14 is a water electrolysis device, a decrease in hydrogen transport performance and energy efficiency can be suppressed as in the case where the cell device 14 is an electrochemical hydrogen compressor.

The present invention that can be understood from the description of the above embodiment includes the first invention, the second invention, and the third invention.

A first aspect of the present invention is an electrochemical cell (24) including: an electrolyte membrane (60); an anode current collector (62) laminated on one surface of the electrolyte membrane (60); a cathode current collector (66) laminated on the other surface of the electrolyte membrane (60); and a supply flow path (70) disposed on a surface of the anode current collector (62) opposite to a surface thereof facing the electrolyte membrane (60) and through which a fluid to be supplied to the anode current collector (62) flows. In the electrochemical cell (24), the anode current collector (62) includes an inner portion (74) in which a first hole (80) is formed, and an outer portion (76) which is located outside the inner portion (74) and in which a second hole (82) is formed, the first hole (80) having a cross-sectional area that increases toward the supply flow path (70), the second hole (82) having a cross-sectional area that increases toward the electrolyte membrane (60).

In the electrochemical cell (24), if the flow rate of the fluid flowing through the supply flow path (70) is increased, negative pressure is generated in the first hole (80) and the second hole (82), and retained water retained on the anode side of the electrochemical cell (24) is sucked out into the supply flow path (70) through the first hole (80). As a result, the electrochemical cell (24) can suppress a decrease in hydrogen transport performance and energy efficiency due to retained water. On the other hand, even if negative pressure is generated in the second hole (82), sucking-out of retained water into the supply flow path (70) through the second hole (82) and the second communication hole (86) is restricted. Thus, the retained water flows from the outer portion (76) to the inner portion (74) of the electrochemical cell (24). As a result, distribution of water in the planes between the layers or the like is made uniform, and drying of the electrolyte membrane (60) is suppressed. As a result, the electrochemical cell (24) can suppress a decrease in hydrogen transport performance and energy efficiency due to drying.

The electrochemical cell (24) may further include an anode catalyst layer (64) interposed between the electrolyte membrane (60) and the anode current collector (62), the anode catalyst layer (64) having a first communication hole (84) communicating with the first hole (80) and a second communication hole (86) communicating with the second hole (82). A cross-sectional area of the first communication hole (84) may continuously increase toward the supply flow path (70), and a cross-sectional area of the second communication hole (86) may continuously increase toward the electrolyte membrane (60). Thus, in the electrochemical cell (24), it becomes easy for a negative pressure to be generated also in the first communication hole (84) in accordance with an increase in the flow rate of the fluid flowing through the supply flow path (70). This increases the force of sucking out the retained water retained on the anode side of the electrochemical cell (24) into the supply flow path (70) through the first hole (80) and the first communication hole (84). Therefore, the removal efficiency of the retained water is enhanced. In the electrochemical cell (24), the retained water easily flows from the outer portion (76) to the inner portion (74) of the electrochemical cell (24). As a result, uniformity of distribution of water in the planes lying between the layers or the like is enhanced.

The inner wall of the first hole (80) may be continuous with the inner wall of the first communication hole (84), and the inner wall of the second hole (82) may be continuous with the inner wall of the second communication hole (86). With this configuration, in the electrochemical cell (24), the force of sucking out the retained water retained on the anode side of the electrochemical cell (24) into the supply flow path (70) through the first hole (80) and the first communication hole (84) is increased. Therefore, the removal efficiency of the retained water is enhanced. In the electrochemical cell (24), the retained water easily flows from the outer portion (76) to the inner portion (74) of the electrochemical cell (24). As a result, uniformity of distribution of water in the planes between the layers or the like is enhanced.

A second aspect of the invention is a cell operation system (10). The cell operation system (10) includes the above electrochemical cell (24); a fluid supply device (12) configured to supply the fluid to the electrochemical cell (24); a power supply device (16) configured to apply a voltage between the anode current collector (62) and the cathode current collector (66); a sensor (88) configured to detect an electrical state between the anode current collector (62) and the cathode current collector (66); and a control device (18) configured to control the power supply device (16) so as to stop application of the voltage and control the fluid supply device (12) so as to increase a flow rate of the fluid flowing through the supply flow path (70) if a value indicating the electrical state exceeds a predetermined threshold value. The cell operation system (10) can generate negative pressure in the first holes (80) to thereby suck out retained water retained on the anode side of the electrochemical cell (24) into the supply flow path (70) through the first holes (80). As a result, the cell operation system (10) can suppress a decrease in hydrogen transport performance and energy efficiency caused by retained water. In addition, the cell operation system (10) can generate a negative pressure in the second holes (82) to thereby cause the retained water to flow from the outer portion (76) to the inner portion (74) of the electrochemical cell (24), thereby making the distribution of water in the planes between the layers or the like, uniform. As a result, the cell operation system (10) can suppress a decrease in hydrogen transport performance and energy efficiency due to drying of the electrolyte membrane (60).

The cell operation system (10) may further include a pressure adjusting valve (36) provided on a discharge flow path (34) through which a generated fluid generated by an electrochemical reaction flows, the pressure adjusting valve (36) being configured to adjust a pressure of the generated fluid. If the value exceeds the threshold value, the control device (18) may control the pressure adjusting valve (36) so as to decrease an opening degree of the pressure adjusting valve (36), and thereafter control the power supply device (16) and the fluid supply device (12). As a result, the pressure of the generated fluid in the discharge flow path (34) increases, and the electrochemical cell (24) is pressed toward the anode side. Therefore, the cell operation system (10) can push out the retained water retained on the anode side of the electrochemical cell (24) to thereby discharge the retained water to the supply flow path (70). As a result, the removal efficiency of the retained water can be increased.

The fluid may be hydrogen gas. If the fluid is hydrogen gas, the cell operation system (10) may produce high-pressure hydrogen gas as a generated fluid.

A third aspect of the present invention is a cell operation method for operating the electrochemical cell (24). The cell operation method includes: applying a voltage between the anode current collector (62) and the cathode current collector (66); and if a value indicating an electrical state between the anode current collector (62) and the cathode current collector (66) exceeds a predetermined threshold value, stopping application of the voltage and increasing a flow rate of the fluid flowing through the supply flow path (70). In this cell operation method, negative pressure can be generated in the first hole (80), and retained water retained on the anode side of the electrochemical cell (24) can be sucked out into the supply flow path (70) through the first hole (80). As a result, the cell operation method can suppress a decrease in hydrogen transport performance and energy efficiency caused by retained water. In addition, in the cell operation method, a negative pressure is generated in the second holes (82) to thereby cause the retained water to flow from the outer portion (76) to the inner portion (74) of the electrochemical cell (24), so that water can be caused to be uniformly distributed in the planes between the layers or the like. As a result, the cell operation method can suppress a decrease in hydrogen transport performance and energy efficiency due to drying of the electrolyte membrane (60).

The cell operation method may further include, if the value exceeds the threshold value, decreasing an opening degree of a pressure adjusting valve (36) provided on a discharge flow path (34) through which a generated fluid generated by an electrochemical reaction flows, and thereafter stopping application of the voltage and increasing a flow rate of the fluid flowing through the supply flow path (70). As a result, the pressure of the generated fluid in the discharge flow path (34) increases, and the electrochemical cell (24) is pressed toward the anode side. Therefore, in the cell operation method, the retained water retained on the anode side of the electrochemical cell (24) can be pushed out and thereby discharged to the supply flow path (70). As a result, the removal efficiency of the retained water can be increased.

The fluid may be hydrogen gas. When the fluid is hydrogen gas, the cell operation method can produce high-pressure hydrogen gas as a generated fluid.

The present invention is not limited to the above-described embodiments, and various configurations can be adopted therein without departing from the essence and gist of the present invention.

What is claimed is:

1. An electrochemical cell comprising:
an electrolyte membrane;
an anode current collector laminated on one surface of the electrolyte membrane;
a cathode current collector laminated on another surface of the electrolyte membrane; and
a supply flow path that is disposed on a surface of the anode current collector opposite to a surface thereof facing the electrolyte membrane and through which a fluid to be supplied to the anode current collector flows,
wherein the anode current collector consists of an inner portion in which a first hole is formed, and an outer portion in which a second hole is formed, the first hole having a cross-sectional area that increases toward the supply flow path, the second hole having a cross-sectional area that increases toward the electrolyte membrane,
the outer portion is located outside the inner portion and adjacent to the inner portion and surrounds the inner portion from outside, and
the inner portion is devoid of the second hole and the outer portion is devoid of the first hole.

2. The electrochemical cell according to claim 1, further comprising:
an anode catalyst layer interposed between the electrolyte membrane and the anode current collector, the anode catalyst layer having a first communication hole communicating with the first hole and a second communication hole communicating with the second hole,
wherein a cross-sectional area of the first communication hole continuously increases toward the supply flow path, and
a cross-sectional area of the second communication hole continuously increases toward the electrolyte membrane.

3. The electrochemical cell according to claim 2, wherein an inner wall of the first hole and an inner wall of the first communication hole are continuous with each other, and an inner wall of the second hole and an inner wall of the second communication hole are continuous with each other.

4. A cell operation system comprising:
an electrochemical cell comprising:
an electrolyte membrane;
an anode current collector laminated on one surface of the electrolyte membrane;
a cathode current collector laminated on another surface of the electrolyte membrane; and
a supply flow path that is disposed on a surface of the anode current collector opposite to a surface thereof facing the electrolyte membrane and through which a fluid to be supplied to the anode current collector flows,
wherein the anode current collector includes an inner portion in which a first hole is formed, and an outer portion which is located outside the inner portion and in which a second hole is formed, the first hole having a cross-sectional area that increases toward the supply flow path, the second hole having a cross-sectional area that increases toward the electrolyte membrane;
a fluid supply device configured to supply the fluid to the electrochemical cell;
a power supply device configured to apply a voltage between the anode current collector and the cathode current collector;
a sensor configured to detect an electrical state between the anode current collector and the cathode current collector; and
a control device configured to control the power supply device so as to stop application of the voltage and control the fluid supply device so as to increase a flow rate of the fluid flowing through the supply flow path if a value indicating the electrical state exceeds a predetermined threshold value.

5. The cell operation system according to claim 4, further comprising:
a pressure adjusting valve provided on a discharge flow path through which a generated fluid generated by an electrochemical reaction flows, the pressure adjusting valve being configured to adjust a pressure of the generated fluid,
wherein, if the value exceeds the threshold value, the control device controls the pressure adjusting valve so as to decrease an opening degree of the pressure adjusting valve, and thereafter controls the power supply device and the fluid supply device.

6. The cell operation system according to claim 4, wherein the fluid is hydrogen gas.

7. A cell operation method of operating an electrochemical cell, the electrochemical cell comprising:
an electrolyte membrane;
an anode current collector laminated on one surface of the electrolyte membrane;
a cathode current collector laminated on another surface of the electrolyte membrane; and
a supply flow path that is disposed on a surface of the anode current collector opposite to a surface thereof facing the electrolyte membrane and through which a fluid to be supplied to the anode current collector flows,
wherein the anode current collector includes an inner portion in which a first hole is formed, and an outer portion which is located outside the inner portion and in which a second hole is formed, the first hole having a cross-sectional area that increases toward the supply flow path, the second hole having a cross-sectional area that increases toward the electrolyte membrane, the cell operation method comprising:
applying a voltage between the anode current collector and the cathode current collector; and
if a value indicating an electrical state between the anode current collector and the cathode current collector exceeds a predetermined threshold value, stopping application of the voltage and increasing a flow rate of the fluid flowing through the supply flow path.

8. The cell operation method according to claim 7, further comprising:

if the value exceeds the threshold value, decreasing an opening degree of a pressure adjusting valve provided on a discharge flow path through which a generated fluid generated by an electrochemical reaction flows, and thereafter stopping application of the voltage and increasing a flow rate of the fluid flowing through the supply flow path.

9. The cell operation method according to claim 7, wherein the fluid is hydrogen gas.

* * * * *